United States Patent [19]

Fitton

[11] 3,909,286

[45] Sept. 30, 1975

[54] MODIFIED, PRECIPITATED ALUMINO SILICATE PIGMENTS

[75] Inventor: Robert C. Fitton, Belair, Md.

[73] Assignee: J. M. Huber Corporation, Locust, N.J.

[22] Filed: Mar. 18, 1974

[21] Appl. No.: 452,496

Related U.S. Application Data

[63] Continuation-in-part of Ser. No. 198,022, Nov. 5, 1971, Pat. No. 3,798,046.

[52] U.S. Cl. ............................ 106/306; 106/288 B
[51] Int. Cl.² .... C09C 1/02; C09C 1/28; C09C 1/40
[58] Field of Search ......... 106/306, 288 B; 423/328, 423/331

[56] References Cited
UNITED STATES PATENTS

| | | | |
|---|---|---|---|
| 2,739,073 | 3/1956 | Bertorelli | 106/306 |
| 2,848,346 | 8/1958 | Bertorelli | 106/306 |
| 3,746,559 | 7/1973 | Hackbarth | 106/288 B |
| 3,798,046 | 3/1974 | Fitton | 106/306 |

*Primary Examiner*—Patrick P. Garvin
*Assistant Examiner*—J. V. Howard
*Attorney, Agent, or Firm*—Harold H. Flanders; Donald S. Lilly

[57] ABSTRACT

Novel alkali aluminum silicate particulates, modified with and containing a chemically bound alkaline earth metal, are disclosed. The alumino silicate pigments contain an alkaline earth metal, preferably calcium or magnesium, in addition to an alkali metal, such as sodium. In chemical composition, the pigments contain oxides of the alkaline earth metal, the alkali metal, aluminum and silicon and are distinguishable from co-precipitates. The pigments are prepared by introducing dilute solutions of an alkali silicate and an aluminum salt of a mineral acid into an agitated aqueous receiving medium containing an alkaline earth salt or hydroxide. The pH of the fluid reaction medium may be controlled to form finely divided precipitated particulates having improved properties and which may be used as pigments in paper, paint, rubber, inks, plastics, and the like.

6 Claims, No Drawings

MODIFIED, PRECIPITATED ALUMINO SILICATE PIGMENTS

REFERENCE TO COPENDING APPLICATIONS

The present application is a continuation-in-part of U.S. Ser. No. 198,022, filed Nov. 5, 1971, and is now allowed U.S. Pat. No. 3,798,046.

BACKGROUND OF THE INVENTION

The present invention relates to finely divided precipitated silicate pigments and, more particularly, to novel modified sodium alumino silicate pigments which are chemically analagous to zeolites but which have certain unique properties and characteristics.

As is well known in the art, natural alkali metal zeolites such as natrolite and analcine are known to possess water softening properties but have limited usefulness as pigments. In recent years a number of artificial or synthetic zeolites containing sodium, aluminum and silicon oxides, in various proportions, have been proposed and synthesized. Examples of synthetic zeolites are disclosed in U.S. Pat. Nos. 2,882,243; 2,962,355; 2,996,358; 3,010,789; 3,011,869; and 3,012,853. To a large extent, known synthetic zeolites lack the essential characteristics of pigments and have found limited use in this field.

In this regard, however, there has been developed novel precipitated sodium alumino silicates that have particular use as pigments in paper coatings, as fillers in rubber compounds, in inks, paints, plastics, and the like. Such pigments are commercially available and are manufactured and sold under the trademark "Zeolex" by J. M. Huber Corporation. While "Zeolex" pigments contain the essential oxide components of natural and synthetic products, these pigments are precipitated products of alumina and d silica and contain chemically bound sodium and as such are readily distinguishable from gels and other synthetically produced materials. In general, these pigments are precipitated amorphous materials and are composed of particles having ultimate sizes of only a few hundredths of a micron in diameter which tend to cling together in clusters of up about 1 micron in diameter. In chemical composition, they typically contain $Na_2O$ and $Al_2O_3$ in a molar ratio near to 1, as in the range of about 0.8 to 1.2 mols of $Na_2O$ per mol of $Al_2O_3$, together with silica which can be present in any of various selected concentrations ranging from as little as about 2.5 mol to as much as about 16 mols of $SiO_2$ per mol of $Al_2O_3$.

As will be discussed in more detail hereinafter, these pigments are advantageously prepared (see e.g., U.S. Pat. No. 2,739,073) by comingling dilute solutions of an alkali silicate and an aluminum salt, such as aluminum sulfate. In a preferred embodiment, an amount of water not greater than about one half of the volume of the solutions to be added is placed in a suitable reaction vessel provided with a strong agitator. The reactants, i.e., the dilute solutions of the alkali silicate and an aluminum salt, are then introduced in streams entering the water at widely spaced points. In U.S. Pat. No. 2,848,346 such pigments are prepared by comingling a dilute solution of an alkali silicate and a dilute solution of a dispersion containing finely divided silica and aluminum sulfate. The latter is prepared by treating kaolin clay with a strong mineral acid, such as sulfuric acid.

SUMMARY OF THE INVENTION

In summary, the present invention relates to alkaline earth modified sodium alumino silicate pigments produced in the manner, and in accordance with, the teachings of U.S. Ser. No. 198,022, filed Nov. 5, 1971. Broadly speaking, the invention covered and disclosed by the aforesaid application, embodies the concept of producing the pigments that are the subject of the present application by a process comprising introducing an alkali metal silicate and an aluminum salt into an agitated receiving medium which contains an alkaline earth metal salt, such as magnesium sulfate.

Products produced in this manner, as will be described in more detail hereinafter, contain chemically bound sodium (i.e., the alkali metal) as well as the chemically bound alkaline earth metal. As such, the products are readily distinguishable from so-called co-precipitates which contain mere mixtures of e.g., an alkali metal alumino silicate and an alkaline earth metal alumino silicate.

it is accordingly a general object of the present invention to provide a novel synthetic pigment.

Another and more particular object is to provide novel modified alumino silicate pigments that are especially useful in paper coatings.

Yet another object is to provide alkaline-earth modified sodium alumino silicate particulates that have particular utility for use in paper, but which may be also advantageously employed as reinforcing pigments or fillers in rubber, in inks, paints, plastics, and the like.

The manner in which the foregoing and other objects are achieved in accordance with the present invention will be better understood in view of the following detailed description.

DESCRIPTION OF PREFERRED EMBODIMENTS(S)

As noted above, in accordance with the present invention and the teachings of U.S. Ser. No. 198,022, it has been discovered that novel alkaline earth metal modified alkali metal alumino silicate pigments can be prepared by introducing dilute solutions of an alkali metal silicate and a water soluble salt of aluminum and a strong acid, (such as aluminum sulfate) into an aqueous reaction media containing dispersed therein an alkaline earth metal salt or hydroxide. As taught in U.S. Ser. No. 198,022, if solutions of the alkali metal silicate and the aluminum sulfate are added to a reaction mass that contains the alkaline earth metal salt or hydroxide, the latter serves as a nucleus or nucleating agent which alters the structure of the resulting modified pigment.

The products of the present invention are compositions containing essentially the oxides of an alkaline earth metal, an alkali metal, aluminum and silicon, that may be represented by the general formula $$a\ X_2O \cdot b\ Al_2O_3 \cdot c\ YO \cdot d\ SiO_2 \cdot e\ H_2O$$

wherein $X$ is an alkali metal such as sodium or potassium and $Y$ is an alkaline earth metal. Particularly advantageous results are obtained if the alkaline earth metal is magnesium or calcium. The small letters, i.e., $a, b, \ldots e$, represent the mols of the oxides present in the total composition. The mol ratio of the constituent oxides may vary widely with the molar ratio of $X_2O$ to $Al_2O_3$ preferably being near to 1, such as about 0.8 to 1.4 mols of $X_2O$ per mol of $Al_2O_3$. The mols of $SiO_2$ to $Al_2O_3$ can be as low as about 2.5 mols up to as much as about 24 mols of $SiO_2$ per mol of $Al_2O_3$. The molar ratio of the alkaline earth oxide (YO) to $Al_2O_3$ can be varied from about 0.1 to 3, preferably from about 1.0 to 1.5. It should be readily understood, however, that a change in the molar ratio of any given two oxides will vary the ratio of one such oxide to another, i.e., a third oxide in the composition. To this end it is more simply stated that the alkaline earth metal salt is added to the reaction medium in an amount such that the alkaline earth metal oxide comprises from about 0.1 to 30% of the dry weight of the pigment, based on the particular alkaline earth metal salt used. For example, if a magnesium salt is employed, the range of the resulting MgO would be about 0.1 to 8.0%. With this parameter the other constituents or reactants, e.g., the alkali metal silicate, can be added in an amount to give the desired molar ratio of $X_2O$ to $Al_2O_3$, etc.

In producing the products of the present invention, and again in accordance with the method disclosed in U.S. Ser. No. 198,022, the solutions of the aluminum salt and the alkali metal silicate are maintained at very low concentrations and under strong agitation during the process of comingling and reacting them together in the body of the reaction mass containing the nuclei, i.e., the alkaline earth salt or hydroxide.

In accordance with a first method embodiment, the dilute solutions of the reactants are charged slowly into the diluting aqueous medium containing the alkaline earth metal salt and are preferably introduced at widely spaced locations therein. The reaction mass is continuously and vigorously stirred or agitated throughout the reaction so as to keep the dispersion in a fluid condition. The alkali metal silicate solutions so used should be about 2 molar or lower concentration, and the concentration of the solution of the aluminum salt should also be about 2 molar or lower concentration.

The reaction medium, i.e., the body of water containing the alkaline earth salt, should preferably be about half the combined volumes of the silicate solution and aluminum salt solution. In this regard, the concentration of the solutions in the reaction mass should average less than about 2.0 molar, depending somewhat upon the particular reactants employed, their purity and other variables. Preferably the reacting concentration is maintained at not more than about 1.0 molar. The solutions of the reactants are introduced into the reacting media at widely spaced points so that a high degree of dilution of each solution is assured. For example, one solution may be added to the vortex created by the agitator blade, while the other solution is added near the wall of the vessel. Alternately, the two solutions may be introduced into the reaction vessel at different levels as e.g., one below the surface with the other being near or above the surface, etc. At the end of the reaction the reaction medium is a fluid mass from which the precipitated solid products of the invention may be easily separated.

In general, the addition of the silicate and aluminum salt can be started simultaneously or a portion of the silicate can be added prior to the addition of the aluminum salt. The pH of the reaction should be maintained between about 8 to 12, preferably from between about 8 and 10, until all of the alkali silicate has been added. The addition of the aluminum salt solution may then be continued until the ph is reduced to between about 8 and 10.0. While the precipitation of the products of the invention can be executed by the simultaneous addition of the alkali silicate solution and the aluminum salt solution, it has been found to be particularly advantageous to add a portion of the solution of the alkali metal silicate (such as sodium meta or disilicate) to the receiving medium prior to the introduction of the solution of the aluminum salt. It is not understood how this affects the mechanics of the reaction or precipitating process other than perhaps affecting the nucleation effect of the alkaline earth metal salt. However products produced in accordance with this second method embodiment have further improved properties, particularly with regard to their brightness and their optical properties in paper. In practicing the latter embodiment, the sodium silicate solution is added to the reaction or receiving media until the pH of the aqueous mass is between 8 and 10. Thereafter the solutions of the sodium silicate and the aluminum salt are added simultaneously to the reaction mass until such time as the total amount of the aluminum salt solution has been added. After the aluminum salt solution has been added, the addition of the silicate solution is continued until the pH of the reaction mass is between about 8.0 to 10.0.

Upon completion of the reaction procedure, the precipitated pigment is separated from the reaction liquid usually by filtration, but other means of separation, such as centrifuging, can be used. It is preferable to wash the separated pigment with water to remove water soluble salts and the like. The resulting filter cake is then dried in any suitable manner. The drying is preferably performed at elevated temperatures with the temperature of the drying step being used to control the percent of the water of the finished pigment. For example, when dried at about 105°C, the pigments usually contain from about 7 to 12 percent water.

It should also be understood that the amount of water remaining in the precipitated pigment depends upon the time, temperature, and other conditions of drying. It is not possible to express conditions which will be required for drying a particular pigment with any degree of exactness. This will vary to a large extend, depending e.g., upon the degree of air circulating through the pigment, the type of drying apparatus, etc. As recognized by those skilled in the art, there is a substantial difference in the manner in which "free water" and "bound water" are held in pigment compositions. Bound water appears to be chemically combined with the silicate pigment. For this reason bound water does not readily come off unless dried at temperatures on the order of about 300°C. On the other hand, free water comes off readily upon drying at relatively moderate temperatures i.e., up to about 105°C.

As discussed above, the starting materials or reactants employed in producing the product of the present invention include alkali metal silicate, the alkaline earth salts or hydroxides and aluminum salts. As used herein, the term alkali metal silicates includes all the common forms of alkali metal silicates as, for example, metasilicates, disilicates, and water glass. Water soluble potassium silicates and sodium silicates are particularly advantageous. Because of their relatively low cost, sodium silicates are preferred. If employed, sodium silicates are effective in any composition in which the mol ratio of the $SiO_2$ to $Na_2O$ is from about 1 to 3.3:1.

The aluminum salts preferably include the water soluble acid salts of aluminum such as aluminum sulfate, aluminum chloride, aluminum nitrate and ammonium alum (aluminum ammonium sulfate). Additionally, the aluminum sulfate solution that is added to the reaction mass may comprise an aqueous slurry of a finely divided precipitated silica suspended in a dilute aqueous solution of the salt of aluminum and a mineral acid. In this regard, the aqueous reactant solution containing the pre-precipitated silica in suspension with the solution of the aluminum salt can be obtained by employing finely divided kaolin as a basic raw material and decomposing the kaolin in an aqueous suspension with sulfuric acid. The term "kaolin" is used herein to designate kaolin or like clays composed predominately of the mineral kaolinite. The decomposition of the kaolin may be carried out in an open vessel if the kaolin has been previously calcined or if uncalcined kaolin is used it should be reacted with the acid in a closed vessel at pressures on the order of about 150 to 160 psi as disclosed in U.S. Pat. No. 2,848,346. The product of this decomposition process is essentially a dilute solution of aluminum sulfate containing very finely divided free silica in suspension.

The alkaline earth salts or hydroxides that may be employed include the salts of hydroxides of metals from Group 2a of the Periodic Table such as magnesium, calcium, and barium. Preferred salts are the water-soluble salts such as the sulfates, carbonates, nitrates, and chlorides. However others can be employed. it has been found that the use of calcium sulfate and magnesium sulfate are particularly advantageous and thus are preferred.

As indicated above, the unique pigments of the present invention may be advantageously employed or used in paper, as reinforcing pigments in rubber compositions, in paints, inks, plastics and the like. Such pigments may, for example, be employed as reinforcing pigments in various rubber compositions including natural rubber and synthetic rubber compositions including butadiene 1,3-styrene copolymers, butadiene-acrylonitrile copolymers, butadiene-isobutylene copolymers and like synthetic elastomers. If employed as rubber pigments of the type described, the alkali silicates should contain from about 1 to about 3.3 molar equivalents of $SiO_2$ per molar equivalent of $Na_2O$ (when the sodium silicate is employed).

While the pigments of the invention may be employed in many applications, it has been unexpectedly discovered that the products are particularly and excellently suited for use in paper. In this regard, pigments produced for paper fillers as described herein should employ alkali silicates having $SiO_2$ in a molar ratio of from about 1.5 to about 3.3 to the content of the alkali oxide ($Na_2O$). Again preferred results are obtained if the mol ratio ($SiO_2/Na_2O$) is from about 2.0 to 2.7.

The following Examples will serve to further illustrate the present invention but it is expressly understood that they are not intended to limit it thereto. The Tables which follow the Examples set forth specific properties and characteristics of the products of the Examples not otherwise included therein. References to Figures are those in U.S. Ser. No. 198,022. As used hereinafter the expression or letters "LOI" refers to loss on ignition, sometimes simply noted as ignition lost. As well known in the art, loss on ignition is determined by heating a sample of the pigment or product being tested in an oven until the sample maintains a constant weight, that is, no further water is driven off upon continued heating. A standard test loss procedure for establishing ignition loss is TAPPI T-618.

EXAMPLE 1

A dilute alkali silicate solution was prepared by dissolving 4,740 lbs. of sodium silicate ($Na_2O$ . 2.5 $SiO_2$) in 2,370 gallons of water. A separate dilute solution of aluminum sulfate was prepared by dissolving 2,500 lbs. $Al_2(SO_4)_3 \cdot 14H_2O$ in 1,000 gallons of water. A 7,500 gal. reaction vessel provided with a propellor type agitator blade was charged with 1,540 gallons of water to which was added 1,282 lbs. of $MgSO_4 \cdot 7 H_2O$, and the agitator was started. The sodium silicate solution was charged to the reaction vessel at a rate of 46.5 GPM as a thin stream directly into the vortex formed by the rotating agitator blade. The addition of the sodium silicate solution was continued for a period of 16 minutes at the end of which time the pH of the reaction mass was 9.9. Thereafter, and with the silicate solution still being introduced, the aluminum sulfate solution was introduced at a rate of 25.1 GPM for an additional period of 35 minutes. The pH, during the simultaneous addition of the silicate solution and the aluminum salt, was reduced to about 9.5. At the end of the 51 minute reaction period all the silicate solution had been added. Thereafter the addition of the aluminum sulfate solution was continued until the final pH of the reaction mass was 8.8. This required an additional 5.0 minutes. The temperature of the solutions of the reactants introduced into the reaction vessel as well as the receiving medium was maintained at about 65°C throughout the reaction. After the pH of the reaction mass was reduced to 8.8 and all of the aluminum salt had been added, agitation of the reaction mass was continued for an additional 15 minutes. The precipitate was then separated by filtration and thoroughly washed with water at ambient temperatures. The resulting filter cake was dried at 110°C. The cake was pulverized in a hammer mill. The material so produced was a finely divided white particulate made up of particles less than 0.05 microns in diameter. The specific gravity of the product was 2.2. The pour density was 9.5 lbs. per cubic foot and the product had a BET surface area of $97 m^2/g$. From a chemical analysis of the product the following formula was calculated:

$$1.3\ Na_2O \cdot 1.0\ Al_2O_3 \cdot 1.2\ MgO \cdot 14.3\ SiO_2 \cdot 4.3\ H_2O$$

EXAMPLE 2

The procedure of Example 1 was repeated except that the sodium silicate employed contained 1.4, 1.83, 2.34, 2.8, and 3.35 mols of $SiO_2$ per mol of $Na_2O$ respectively. The products obtained in this Example possessed properties similar to those of product of Example 1.

EXAMPLE 3

The general procedure of Example 1 was repeated except that magnesium chloride, magnesium hydroxide, and magnesium nitrate, were substituted for the magnesium sulfate of Example 1. The products obtained were substantially the same as that in Example 1.

EXAMPLE 4

The general procedure of Example 1 was repeated except that the aluminum sulfate and sodium silicate solutions were added simultaneously at the outset of the reaction or precipitation process. In addition the pH of the reaction mass was maintained constant (8.0) by adjusting the rate of addition of the two solutions. At the end of the reaction period, which required 51 minutes, the final pH of the slurry was increased to 9.5 by the addition of a dilute solution of the silicate. This required an additional 3 minutes. The product produced in this Example was substantially the same as the product of Example 1.

EXAMPLE 5

The general procedure of Example 1 was repeated except that aluminum chloride, aluminum nitrate and ammonium alum were substitued for the aluminum sulfate employed in Example 1. The products produced were substantially the same as that of Example 1.

EXAMPLE 6

The general procedure of Example 1 was repeated except that in a series of two test runs the reaction vessel was charged with 1,480 gallons of water to which was added 1,081 lbs. of calcium sulfate and 1,053 lbs. of calcium carbonate, respectively. After the precipitate was recovered by filtration, washed and dried, the product from test run No. 2 was reslurried and treated with sufficient HCl to reduce the pH of the slurry to about 3.5 Thereafter sufficient NaOH was added to the pigment slurry to increase the slurry pH to 8.8. The products obtained both prior to and after the additional treatment with NaOH possessed properties similar to that of the products of Example 1. In a series of further tests the above general procedure was repeated except that the amount of the calcium salt was varied and sodium silicate was substituted for the NaOH. (See Table 3 below).

EXAMPLE 7

The procedure of Example 1 was repeated except that the aluminum sulfate solution consisted of a slurry of finely divided precipitated silica in a solution of aluminum sulfate that was prepared by reacting 3250 lbs. of commercial kaolin with 4000 lbs. of 95% sulfuric acid in 1,000 gallons of water. The slurry was formed by agitating the kaolin with the sulfuric acid in a lead line autoclave at a temperature of 185°C for 10 hours. This reaction mass was cooled, discharged and made up to volume of 3,000 gallons by the addition of water. In examination, the finely divided precipitated silica particles suspended in the aqueous solution of aluminum sulfate showed that almost all the precipitated silica particles were less than 0.2 microns in its greatest dimension. The separate dilute solution of the sodium silicate and the aluminum sulfate solution containing the finely divided precipitate silica was then charged to the reaction vessel in the manner of Example 1. The precipitate was recovered by filtration with water and dried at 110°C. The filter cake was obtained in the form of soft lumps. On passing these lumps through the hammer mill a white powder was obtained, substantially all the particles of which were smaller than 0.5 microns in their greatest diameter.

EXAMPLE 8

The procedure of Example 1 was repeated except that the reaction vessel was charged with 1,500 gallons of water to which was added 1,085 lbs. of barium sulfate. The product produced in this Example was substantially the same as that of Example 1.

EXAMPLE 9

The procedure of Example 1 was repeated except that a mixture of $MgSO_4 \cdot 7 H_2O$ and $CaCO_3$ (641 lbs. each or a total of 1,282 lbs.) was charged to the reaction vessel containing 1,540 gallons of water. The general properties of the product produced in this Example (e.g., particle size, surface area, density, etc.) were similar to those of the product of Example 1. Further properties of the pigment are shown in the Table set forth hereinbelow.

EXAMPLE 10

The general procedure of Example 1 was used to prepare 7 batches under varied reaction pH ranges. FIG. 5 shows the reaction pH ranges under which these batches were precipitated. These Examples clearly establish the flexibility of the method of the invention to produce a given product consistently. Table 4 shows the effect of these variations on the physical properties of the product. Table 5 illustrates the fine paper properties of the products produced in accordance with this Example.

EXAMPLE 11

The general procedure of Example 1 was repeated except that the amount of the $MgSO_4$ added to the receiving medium was varied (See Table 2 below) such that the final product contained varying amounts of magnesium based on the dry weight of the product.

EXAMPLE 12

In this Example, the procedure of Example 2 of U.S. Pat. No. 2,739,073 was duplicated and the resulting pigment recovered. Comparative data of the properties of this pigment (fine paper properties) and that of the pigment produced in accordance with Examples 1–11, is shown in Tables 2 and 3 (with the pigment produced by way of Example 2 of the patent being identified as "Zeolex 23").

EXAMPLE 13

In this Example, the procedure of Example 3 of U.S. Pat. No. 2,739,073 was duplicated. The resulting pigment product was recovered. Comparative data of the properties of this pigment and that of the pigment produced in accordance with Examples 1–11 is shown in the following Tables with the product of Example 3 of the said patent being identified as "Zeolex 20."

EXAMPLE 14

The procedure of Example 3 of U.S. Pat. No. 2,739,073 was duplicated except that $MgSO_4$ was substituted for the calcium hydroxide. It was found that this product had properties substantially the same as the product produced by Example 3 of U.S. Pat. No. 2,739,073 (see Example 13 above) with comparative data for the two pigments with that of the product produced in accordance with Examples 1–11 also being substantially the same. At this point it may be noted that in Example 3 of U.S. Pat. No. 2,739,073, the percent of the calcium hydroxide employed therein is 5% Ca (7.5% CaO). In a series of further tests, the procedures of Example 3 of this patent (see Example 13 above) was repeated except that the amount of the calcium hydroxide employed was varied so that the amount of the calcium oxide present in the product was from about 0.1 to 8% based on the dry weight of the composition. The resulting pigments had substantially the same properties as the pigment produced in accordance with Example 3 of the said patent. This was also found to be true when varying the amounts of $MgSO_4$ substituted for the calcium salt as set forth in this Example.

TABLE 1

CHEMICAL-PHYSICAL PROPERTIES OF PIGMENTS MODIFIED WITH MAGNESIUM AND CALCIUM

| Pigment | | Pigment (Elrepho) Brightness | % LOI | 20% pH | % 325 Residue | Valley Abrasion mg loss | Oil Absorption cc/100 g | Density, No./ft$^3$ | | BET Surface Area |
|---|---|---|---|---|---|---|---|---|---|---|
| | | | | | | | | Pour | Pack | |
| Example 1 | $MgSO_4$ | 90.8 | 7.0 | 11.3 | 4.4 | 6.2 | 132 | 10.0 | 20.9 | 97 |
| Example 2 | $MgSO_4$ | 91.6 | 8.1 | 10.9 | 3.7 | 2.7 | 140 | 8.6 | 18.3 | 114 |
| Example 2 | $MgSO_4$ | 91.6 | 8.1 | 11.4 | 5.1 | 5.5 | 156 | 10.0 | 21.6 | 106 |
| Example 2 | $MgSO_4$ | 91.0 | 7.6 | 11.2 | 3.6 | 10.9 | 135 | 10.4 | 22.4 | 102 |
| Example 2 | $MgSO_4$ | 91.1 | 7.5 | 11.3 | 4.8 | 7.5 | 140 | 10.0 | 17.5 | 122 |
| Example 2 | $MgSO_4$ | 91.7 | 8.0 | 11.3 | 0.9 | 8.0 | 136 | 10.8 | 22.0 | 105 |
| Example 3 | $MgCl_2$ | 90.4 | 9.7 | 10.6 | 0.8 | 4.3 | 138 | 10.2 | 20.1 | 142 |
| Example 3 | $Mg(OH)_2$ | 90.8 | 9.2 | 10.4 | 2.4 | 7.8 | 131 | 10.2 | 22.3 | 142 |
| Example 3 | $MgNO_3$ | 91.0 | 9.6 | 10.1 | 1.8 | 6.8 | 135 | 12.0 | 25.0 | 176 |
| Example 4 | $MgSO_4$ | 91.3 | 8.1 | 11.0 | 5.3 | 6.6 | 148 | 9.2 | 20.1 | 119 |
| Example 6 | $CaSO_4$ | 90.8 | 8.5 | 11.3 | 1.25 | 6.0 | 132 | 10.1 | 20.8 | 105 |
| Example 6 | $CaCO_3$ | 91.0 | 9.3 | 10.9 | 0.81 | 8.0 | 170 | 9.9 | 22.0 | 111 |
| Example 8 | $BaSO_4$ | 91.2 | 9.0 | 11.3 | 1.01 | 6.5 | 160 | 10.2 | 23.2 | 112 |
| Example 9 | $MgSO_4$ & $CaCO_3$ | 91.4 | 8.9 | 11.0 | 1.04 | 7.5 | 156 | 10.4 | 20.4 | 130 |

TABLE 2

FINE PAPER PROPERTIES OF PIGMENTS MODIFIED WITH MAGNESIUM

| Pigment | % Mg in Pigment | % Solids of Wet Cake | % FIL | % Pigment Retention | TAPPI Brightness | TAPPI Opacity |
|---|---|---|---|---|---|---|
| Unfilled Zeolex 23-Control | — | — | | | 87.0 | 80.0 |
| Example 11 | None | 28.4 | 3 | 56 | 88.0 | 81.2 |
| | | | 6 | 52 | 88.3 | 82.1 |
| | | | 9 | 50 | 88.9 | 83.0 |
| Example 11 | 0.43 | 26.4 | 3 | 49 | 88.0 | 81.6 |
| | | | 6 | 53 | 88.6 | 82.9 |
| | | | 9 | 50 | 89.3 | 83.8 |
| Example 11 | 0.49 | 27.5 | 3 | 48 | 87.9 | 81.6 |
| | | | 6 | 45 | 88.5 | 83.0 |
| | | | 9 | 42 | 88.9 | 83.9 |
| Example 11 | 0.43 | 29.3 | 3 | 48 | 88.0 | 81.6 |
| | | | 6 | 53 | 88.8 | 83.1 |
| | | | 9 | 50 | 89.0 | 84.1 |
| Example 11 | 0.55 | 26.4 | 3 | 57 | 88.0 | 81.5 |
| | | | 6 | 52 | 88.6 | 82.7 |
| | | | 9 | 49 | 89.0 | 83.6 |
| Example 11 | 0.56 | 29.7 | 3 | 51 | 88.2 | 81.6 |
| | | | 6 | 47 | 88.9 | 82.9 |
| | | | 9 | 44 | 89.3 | 83.9 |
| | | | — | — | 88.4 | 79.3 |
| Example 11 | 1.5 | 28.7 | 3 | 53 | 88.9 | 81.6 |
| | | | 6 | 51 | 89.3 | 83.2 |
| | | | 9 | 52 | 89.5 | 84.0 |
| Example 11 | 3.3 | 24.0 | 3 | 48 | 88.9 | 81.7 |
| | | | 6 | 46 | 89.3 | 83.6 |
| | | | 9 | 48 | 89.5 | 84.9 |
| Example 11 | 2.7 | 26.0 | 3 | 48 | 89.0 | 81.2 |
| | | | 6 | 47 | 89.5 | 82.8 |
| | | | 9 | 47 | 89.8 | 83.8 |
| Example 11 | 2.7 | 24.1 | 3 | 44 | 89.0 | 81.5 |
| | | | 6 | 42 | 89.5 | 82.9 |
| | | | 9 | 47 | 89.7 | 83.5 |
| Example 11 (Note: in this test, pigment reslurried and treated in accordance with Example 6) | 1.8 | 27.3 | 3 | 44 | 89.2 | 81.0 |
| | | | 6 | 44 | 89.8 | 83.3 |
| | | | 9 | 42 | 90.2 | 84.2 |
| Example 11 | 8.0 | 26.6 | 8 | 45 | 89.2 | 81.7 |
| | | | 6 | 44 | 89.6 | 83.7 |
| | | | 9 | 42 | 90.0 | 84.9 |

TABLE 3

FINE PAPER PROPERTIES OF PIGMENTS MODIFIED WITH CALCIUM AND BARIUM

| Pigment | % Ca in Pigment | % Solids of Wet Cake | % FIL | % Pigment Retention | TAPPI Brightness | TAPPI Opacity |
|---|---|---|---|---|---|---|
| Unfilled | — | — |  |  | 88.0 | 80.3 |
| Zeolex 23 (Control) | None | 28.6 | 3 | 55 | 88.7 | 82.0 |
|  |  |  | 6 | 53 | 89.0 | 82.5 |
|  |  |  | 9 | 52 | 89.2 | 84.3 |
| Example 6 (CaSO$_4$) | 0.4 | 24.3 | 3 | 52 | 88.7 | 82.2 |
|  |  |  | 6 | 57 | 89.1 | 83.7 |
|  |  |  | 9 | 56 | 89.4 | 84.7 |
| Example 6 (CaSO$_4$) | 0.55 | 23.6 | 3 | 47 | 88.9 | 82.1 |
|  |  |  | 6 | 49 | 89.1 | 83.6 |
|  |  |  | 9 | 46 | 89.4 | 84.7 |
| Example 6 (CaSO$_4$) | 4.1 | 25.4 | 3 | 47 | 89.2 | 82.0 |
|  |  |  | 6 | 49 | 89.4 | 83.4 |
|  |  |  | 9 | 47 | 89.7 | 84.6 |
| Example 6 (CaCO$_3$) | 4.3 | 25.2 | 3 | 47 | 89.2 | 82.0 |
|  |  |  | 6 | 49 | 89.4 | 83.3 |
|  |  |  | 9 | 47 | 89.7 | 84.4 |
| Example 6 (CaSO$_4$) | 4.6 | 28.8 | 3 | 47 | 89.6 | 82.4 |
|  |  |  | 6 | 49 | 89.9 | 84.1 |
|  |  |  | 9 | 46 | 89.9 | 85.5 |
| Example 6 (CaCO$_3$) | 3.9 | 29.0 | 3 | 47 | 89.1 | 82.2 |
|  |  |  | 6 | 47 | 89.4 | 83.8 |
|  |  |  | 9 | 46 | 89.6 | 85.1 |
|  | % Ba in Pigment |  |  |  |  |  |
| Example 8 (BaSO$_4$) | 4.0 | 28.7 | 3 | 46 | 89.1 | 82.2 |
|  |  |  | 6 | 49 | 89.4 | 84.0 |
|  |  |  | 9 | 46 | 89.6 | 86.3 |

TABLE 4

PHYSICAL PROPERTIES AND REACTION CONDITIONS OF PIGMENTS MODIFIED WITH MAGNESIUM IN ACCORDANCE WITH EXAMPLE 10

| Run No. | Min. Excess Silicate | Prec. pH Range | Final pH | % LOI | Valley Abrasion mg-loss | %325 screen residue | BET Surface area m$^2$/g | Oil Absorption cc/100g | Pigment Brightness |
|---|---|---|---|---|---|---|---|---|---|
| 1 | 16 | 10.0–10.0 | 8.8 | 6.52 | 4.5 | 0.24 | 110 | 112 | 93.3 |
| 2 | 16 | 10.0– 9.0 | 8.8 | 6.81 | 5.6 | 0.16 | 101 | 110 | 93.5 |
| 3 | 16 | 10.0– 9.0 | 8.8 | 6.53 | 6.5 | 0.12 | 71 | 108 | 93.3 |
| 4 | 20 | 10.5–10.5 | 8.8 | 6.42 | 5.6 | 0.48 | 124 | 118 | 92.7 |
| 5 | 20 | 10.5– 9.5 | 8.8 | 6.43 | 4.2 | 0.12 | 108 | 120 | 93.3 |
| 6 | 20 | 10.5– 9.5 | 8.8 | 6.55 | 2.9 | 0.14 | 82 | 110 | 93.5 |
| 7 | 6 | 8.0 – 8.0 | 9.8 | 7.06 | 4.1 | 0.06 | 75 | 137 | 94.5 |
| 8 | 6 | 8.0 –9.0 | 9.8 | 6.38 | 2.9 | 0.04 | 59 | 127 | 94.1 |
| 9 | 6 | 8.0 – 9.8 | 9.8 | 6.56 | 1.5 | 0.10 | 61 | 136 | 93.2 |

TABLE 5

FINE PAPER PROPERTIES OF DRIED AND MILLED MAGNESIUM MODIFIED SILICATE PIGMENTS PRODUCED IN ACCORDANCE WITH EXAMPLE 10

| Run No. | Minutes Excess Silicate | Prec. pH Range | Final pH | % Filler | % Pigments Retention | Tappi Brightness | Pigments Tappi Opacity |
|---|---|---|---|---|---|---|---|
| Control |  |  |  | unfilled |  | 85.6 | 82.0 |
| 1 | 16 | 10.0–10.0 | 8.8 | 3 | 50 | 87.1 | 85.0 |
|  |  |  |  | 6 | 49 | 87.9 | 87.0 |
|  |  |  |  | 9 | 48 | 88.5 | 88.3 |
| 2 | 16 | 10.0– 9.0 | 8.8 | 3 | 51 | 87.1 | 85.0 |
|  |  |  |  | 6 | 51 | 87.9 | 87.2 |
|  |  |  |  | 9 | 50 | 88.5 | 88.5 |
| 3 | 16 | 10.0– 9.0 | 8.8 | 3 | 51 | 87.1 | 85.0 |
|  |  |  |  | 6 | 52 | 87.9 | 87.2 |
|  |  |  |  | 9 | 52 | 88.6 | 88.6 |
| 4 | 20 | 10.5–10.5 | 8.8 | 3 | 50 | 87.1 | 84.8 |
|  |  |  |  | 6 | 50 | 87.9 | 86.9 |
|  |  |  |  | 9 | 47 | 88.5 | 88.2 |
| 5 | 20 | 10.5– 9.5 | 8.8 | 3 | 50 | 87.1 | 84.8 |
|  |  |  |  | 6 | 50 | 87.9 | 86.9 |
|  |  |  |  | 9 | 48 | 88.5 | 88.1 |
| 6 | 20 | 10.5– 9.5 | 8.8 | 3 | 48 | 87.1 | 85.0 |
|  |  |  |  | 6 | 47 | 88.0 | 87.1 |
|  |  |  |  | 9 | 50 | 88.6 | 88.5 |
| 7 | 6 | 8.0– 8.0 | 9.8 | 3 | 50 | 87.3 | 85.4 |
|  |  |  |  | 6 | 49 | 88.3 | 87.6 |
|  |  |  |  | 9 | 50 | 89.1 | 89.0 |
| 8 | 6 | 8.0 – 9.0 | 9.8 | 3 | 50 | 87.3 | 85.4 |
|  |  |  |  | 6 | 48 | 88.3 | 87.6 |
|  |  |  |  | 9 | 50 | 89.0 | 89.0 |
| 9 | 6 | 8.0 – 9.8 | 9.8 | 3 | 49 | 87.1 | 85.2 |
|  |  |  |  | 6 | 48 | 88.0 | 87.3 |
|  |  |  |  | 9 | 49 | 88.6 | 88.7 |

TABLE 6

PHYSICAL PROPERTIES OF THE PRODUCT OF THE INVENTION AND THE PRIOR ART

| Properties | Product of Invention (Example 10, Run 2) | Prior Art (Zeolex 20) (Example 13) |
|---|---|---|
| 20% pH | 9.9 | 10.4 |
| % LOI | 7.7–8.5 | 12.6 |
| Alkalinity meg/100g | 44 | 148 |
| Oil Adsorption cc/100g | 126 | 140 |
| BET Surface Area M²/g | 54 | 72 |
| %325 Screen Residue | 0.02–0.06 | 8.0–10.0 |

NOTE: From further tests it was found that the product of the invention (as per Examples 1–11) had the following range of properties: 20%pH—8.5 to 10; %LOI—6 to 8.5; alkalinity (meg/100g)—40 to 60; oil adsorption (cc/100g)—100 to 145; BET surface are (M²/g)—50 to 120; and %325 Screen Residue—.02 to .06. This combination of properties is unique and could not be reproduced following the teachings and examples of U.S. 2,739,073. The product of the invention has a lower pH and alkalinity. This is believed to be due to the manner in which the alkaline earth metal is bound to the pigment. The LOI shows, e.g., a difference in the amount of bound water.

TABLE 7

COMPARATIVE DATA-FINE PAPER PROPERTIES

| Pigment | % Alkaline EARTH | % FILLER | % Pigment RETAINED | TAPPI BRIGHTNESS | TAPPI OPACITY |
|---|---|---|---|---|---|
| Unfilled | 0 | — | — | 85.9 | 82.1 |
| Zeolex 23 (Control) | 0 | 3 | 40 | 87.1 | 85.3 |
| Example 2—U.S. 2,739,073 |  | 6 | 40 | 87.9 | 87.4 |
|  |  | 9 | 39 | 88.6 | 88.2 |
| Zeolex 20 | 5% Ca | 3 | 53 | 86.5 | 83.4 |
| Example 3—U.S. 2,739,073 |  | 6 | 50 | 86.9 | 84.4 |
|  |  | 9 | 47 | 87.1 | 85.0 |
| Zeolex 20 (Mg) | 5% Mg | 3 | 50 | 86.6 | 83.1 |
| Example 14 of Application |  | 6 | 50 | 87.0 | 83.8 |
|  |  | 9 | 49 | 87.3 | 84.3 |
| Product of Example 10 (Run 8) | 3% | 3 | 47 | 87.6 | 87.6 |
|  |  | 6 | 46 | 88.7 | 88.7 |
|  |  | 9 | 48 | 89.5 | 89.5 |
| Product of Example 6 | 3% | 3 | 47 | 87.4 | 85.2 |
|  |  | 6 | 48 | 88.1 | 87.0 |
|  |  | 9 | 49 | 89.0 | 88.2 |
| Product of Example 8 | 3% | 3 | 48 | 87.2 | 85.4 |
|  |  | 6 | 48 | 87.9 | 87.3 |
|  |  | 9 | 49 | 88.8 | 88.5 |

To further illustrate the uniqueness of the pigment of the invention with that of the prior art, the pigment of the invention was tested in a rubber formulation, shown in Table 8 below, and compared with an identical formulation except that the pigment employed was that produced in accordance with Example 3 of U.S. Pat. No. 2,739,073 (see Example 13 above).

Tests on the rubber formulation included the following: A. Hardness Data — Olsen Test pieces 8–12 at 320°F.; B. Abrasion Data — NBS 8–12 at 320°F.; C. Olsen Stiffness on Unaged Ross Flex pieces, 8 inch lbs., 4 inch Span, 8–12 at 320°F.; and D. Rheometer Data: (1) 320°F. (2) Hi Speed. (3) 30 foot Chart Motor. (4) Range 100. (5) Preheat 60 Secs. (6) 3° Arc.

TABLE 8

| Ingredients | Parts/100 RHC |
|---|---|
| SBR 1502 | 100.0 |
| Pliolite S6B | 20.0 |
| Zinc Oxide | 3.0 |
| Stearic Acid | 2.0 |
| Cumar MH 2½ | 7.5 |
| Pigment (Ex. 11, 1.5% Mg) | 66.5 |
| Santocure | 2.0 |
| DOTG | 1.0 |
| Sulfur | 2.5 |
| Total | 204.5 Sp.Gr. 1.215 |

The results of the test established when the pigment produced as per Example 3 of U.S. Pat. No. 2,739,073 was employed, the rubber formulation cured too fast resulting in a hard, stiff rubber with poor abrasion resistance. On the other hand, the pigment of the invention produced good rubber reinforcing with high abrasion resistance, increased modulus, tensile strength and elongation. The Olsen stiffness was 100 (8 inch cure) for the pigment of the invention vs. 187 and 191 (6 foot and 8 foot respectively) for the pigment of the prior art. The NBS abrasion was 100 vs 67 and 65 for the same cure rates. A further summary of the tests is shown in Table 9.

TABLE 9

| Pigment | Cure Min. | 200% Modulus | 300% Modulus | Tensile | Elongation | Tear Data Longitudinal | Tear Data Transverse | Tear Data Average |
|---|---|---|---|---|---|---|---|---|
| Example 11 | 6 | 950 | 1275 | 2033 | 500 | 267 | 279 | 273 |
| (1.5% Mg) | 8 | 1008 | 1342 | 1950 | 467 | 278 | 266 | 272 |
|  | 12 | 983 | 1317 | 1883 | 467 | 270 | 273 | 272 |
| Example 3 of | 4 | 858 | 1092 | 1717 | 477 | 266 | 285 | 276 |
| U.S. 2,739,073 | 6 | 850 | 1075 | 1675 | 467 | 263 | 270 | 267 |
| (Prior Art) | 10 | 892 | 1150 | 1642 | 433 | 265 | 265 | 265 |

Note: Test pieces employing pigment of Example 3 (U.S. 2,739,073) were cured for 6 and 10 minutes in order to achieve the same degree of cure as 8 and 12 minute cures when pigment of invention is employed.

What is claimed is:

1. A finely divided, precipitated, white powdery composition comprising chemically bound oxides of magnesium, sodium, aluminum, and silicon in a uniform matrix substantially all of the particles of which are less than 1 micron in diameter, the molar ratio of $SiO_2$ to $Na_2O$ being at least about 4 to 1 and the molar ratio of $Na_2O$ to $Al_2O_3$ being from about 0.8 to 1.4:1, said magnesium oxide being present in an amount of from about 0.1 to 8 percent based on the dry weight of the composition; said composition having a specific gravity of 2.0 to 2.4; said composition further having an alkalinity in the range of from about 40–60 meg/100 g; a LOI in the range of from about 6–8.5% by weight; an oil absorption in the range of from about 110 to 145 cc/100 g and a surface area in the range of from about 50 to 120 $M^2/g$.

2. A finely divided precipitated, white powdery composition comprising chemically bound oxides of calcium, sodium, aluminum, and silicon in a uniform matrix substantially all of the particles of which are less than 1 micron in diameter, the molar ratio of $SiO_2$ to $Na_2O$ being at least about 4 to 1 and the molar ratio of $Na_2O$ to $Al_2O_3$ being from about 0.8 to 1.4:1, said calcium being present in an amount of from about 0.1 to 8 percent based on the dry weight of the composition having a specific gravity of 2.0 to 2.4; said composition further having an alkalinity in the range of from about 40–60 meg/100 g; a LOI in the range of from about 6–8.5% by weight; an oil absorption in the range of from about 110 to 145 cc/100 g and a surface area in the range of from about 50 to 120 $M^2/g$.

3. A finely divided, precipitated, white powdery composition comprising chemically bound oxides of barium, sodium, aluminum, and silicon in a uniform matrix substantially all of the particles of which are less than 1 micron in diameter, the molar ratio of $SiO_2$ to $Na_2O$ being at least about 4 to 1 and the molar ratio of $Na_2O$ to $Al_2O_3$ being from about 0.8 to 1.4:1, said barium being present in an amount of from about 0.1 to 8 percent based on the dry weight of the composition having a specific gravity of 2.0 to 2.4; said composition further having an alkalinity in the range of from about 40–60 meg/100g; a LOI in the range of from about 6–8.5% by weight; an oil absorption in the range of from about 110 to 145 cc/100g and a surface area in the range of from about 50 to 120 $M^2/g$.

4. The composition in accordance with claim 1, said composition further comprising the oxides of magnesium, sodium, aluminum, and silicon precipitated in intimate association with finely divided particles of pre-precipitated silica.

5. The composition in accordance with claim 2, said composition further comprising the oxides of calcium, sodium, aluminum, and silicon precipitated in intimate association with finely divided particles of pre-precipitated silica.

6. The composition in accordance with claim 3, said composition further comprising the oxides of barium, sodium, aluminum, and silicon precipitated in intimate association with finely divided particles of pre-precipitated silica.

* * * * *

UNITED STATES PATENT OFFICE
CERTIFICATE OF CORRECTION

PATENT NO. : 3,909,286
DATED : September 30, 1975
INVENTOR(S) : Robert C. Fitton It is certified that error appears in the above—identified patent and that said Letters Patent are hereby corrected as shown below:

Column 1, line 37, following "and" (first instance), "d" should be omitted.

Column 1, lines 44-45, following "up" and before "about", insert -- to --.

Column 2, line 22, capitalize "i" on "it".

Column 5, line 29, capitalize "i" on "it".

Columns 9-10, columnar heading for ninth and tenth columns, "Density, No./ft$^3$" should be -- Density, lbs/ft$^3$.

Columns 9-10, third line from bottom of page under column "% FIL", the numeral "8" should be -- 3 --.

Column 13, Table 6, "Product of Invention" should be over columnar heading "(Example 10, Run 2)" and "Prior Art" should be over columnar heading "(Zeolex 20)".

Column 13, next to last line, "30 foot Chart Motor" should be -- 30 minute chart motor --.

Column 14, lines 45-46, "(6 foot and 8 foot respectively)" should be -- (6 minute and 8 minute, respectively) --.

Column 15, claim 2, first line, following "finely divided" insert -- , --.

Signed and Sealed this

Thirtieth Day of November 1976

[SEAL]

Attest:

RUTH C. MASON
Attesting Officer

C. MARSHALL DANN
Commissioner of Patents and Trademarks